US012561562B2

(12) United States Patent
Dronen et al.

(10) Patent No.: US 12,561,562 B2
(45) Date of Patent: Feb. 24, 2026

(54) ACCURACY OF LOW-BITWIDTH NEURAL NETWORKS BY REGULARIZING THE HIGHER-ORDER MOMENTS OF WEIGHTS AND HIDDEN STATES

(71) Applicant: Lightmatter, Inc., Boston, MA (US)

(72) Inventors: Nicholas Dronen, Newton, MA (US); Tyler J. Kenney, Boston, MA (US); Tomo Lazovich, Cambridge, MA (US); Ayon Basumallik, Framingham, MA (US); Darius Bunandar, Boston, MA (US)

(73) Assignee: Lightmatter, Inc., Mountain View, CA (US)

( * ) Notice: Subject to any disclaimer, the term of this patent is extended or adjusted under 35 U.S.C. 154(b) by 1047 days.

(21) Appl. No.: 17/672,627

(22) Filed: Feb. 15, 2022

(65) Prior Publication Data

US 2022/0261645 A1 Aug. 18, 2022

Related U.S. Application Data

(60) Provisional application No. 63/150,032, filed on Feb. 16, 2021.

(51) Int. Cl.
*G06N 3/08* (2023.01)
*G06F 17/16* (2006.01)
*G06N 3/065* (2023.01)

(52) U.S. Cl.
CPC .............. *G06N 3/08* (2013.01); *G06F 17/16* (2013.01); *G06N 3/065* (2023.01)

(58) Field of Classification Search
CPC ........ G06N 3/08; G06N 3/065; G06N 3/0675; G06F 17/16
See application file for complete search history.

(56) References Cited

U.S. PATENT DOCUMENTS 10,534,189 B2 1/2020 Miller
10,740,693 B2 8/2020 Lazovich et al.
(Continued)

OTHER PUBLICATIONS

Ulseth et al. ("Training of mixed-signal optical convolutional neural network with reduced quantization level", 2020 arxiv) (Year: 2020).*
(Continued)

*Primary Examiner* — Imad Kassim
(74) *Attorney, Agent, or Firm* — Wolf, Greenfield & Sacks, P.C.

(57) ABSTRACT

Methods and systems for training neural networks using low-bitwidth accelerators are described. The methods described herein use moment-penalization functions. For example, a method comprises producing a modified data set by training a neural network using a moment-penalization function and the data set. The moment-penalization function is configured to penalize a moment associated with the neural network. Training the neural network in turn comprises quantizing the data set to obtain a fixed-point data set so that the fixed-point data set represents the data set in a fixed-point representation, and passing the fixed-point data set through an analog accelerator. The inventors have recognized that training a neural network using a modified objective function augments the accuracy and robustness of the neural network notwithstanding the use of low-bitwidth accelerators.

24 Claims, 10 Drawing Sheets

(56) References Cited

U.S. PATENT DOCUMENTS

| | | | | |
|---|---|---|---|---|
| 10,763,974 | B2 | 9/2020 | Bunandar et al. | |
| 10,803,259 | B2 | 10/2020 | Kenney et al. | |
| 11,315,019 | B2 * | 4/2022 | Nachum | G06N 3/047 |
| 2017/0351293 | A1 | 12/2017 | Carolan et al. | |
| 2018/0046913 | A1 * | 2/2018 | Yu | G06F 13/102 |
| 2018/0274900 | A1 | 9/2018 | Mower et al. | |
| 2019/0370652 | A1 | 12/2019 | Shen et al. | |
| 2020/0134324 | A1 * | 4/2020 | Zeng | G06V 10/96 |
| 2020/0250518 | A1 | 8/2020 | Khoury et al. | |
| 2020/0387798 | A1 * | 12/2020 | Hewage | G06N 3/08 |
| 2020/0394523 | A1 * | 12/2020 | Liu | G06F 17/18 |
| 2021/0089906 | A1 | 3/2021 | Lazovich | |
| 2021/0125066 | A1 | 4/2021 | Lazovich | |
| 2021/0241156 | A1 * | 8/2021 | Lai | G06F 17/18 |
| 2021/0405682 | A1 | 12/2021 | Gould et al. | |
| 2022/0092424 | A1 * | 3/2022 | Almazán Manzanares | |
| | | | | G06N 3/08 |

OTHER PUBLICATIONS

Ververidis et al. ("Gaussian Mixture Modeling by Exploiting the Mahalanobis Distance", IEEE vol. 56, No. 7, Jul. 2008) (Year: 2008).*

Shkolnik et al. ("Robust Quantization: One Model to Rule Them All", NeurIPS 2020) (Year: 2020).*

Cao et al. ("Deep Priority Hashing", MM'18, Oct. 22-26, 2018, pp. 1653-1661) (Year: 2018).*

Duchi et al. ("Variance-based Regularization with Convex Objectives", Journal of Machine Learning Research 19 (2018) 1-55) (Year: 2018).*

Alfadly et al. ("Analytical Moment Regularizer for Gaussian Robust Networks", 2019) (Year: 2019).*

Abu-Mostafa et al., Optical neural computers. Scientific American 256.3 (1987):88-95.

Amit et al., Spin-glass models of neural networks. Physical Review A. 1985;32(2):1007-1018.

Atabaki et al., Integrating photonics with silicon nanoelectronics for the next generation of systems on a chip. Nature. 2018;556(7701):349-354. 10 pages. DOI: 10.1038/s41586-018-0028-z.

Bruck et al., On the power of neural networks for solving hard problems. American Institute of Physics. 1988. pp. 137-143. 7 pages.

Canziani et al., Evaluation of neural network architectures for embedded systems. Circuits and Systems (ISCAS). 2017 IEEE International Symposium. 4 pages.

Chen et al., DianNao: A small-footprint high-throughput accelerator for ubiquitous machine-learning. ACM Sigplan Notices. 2014;49:269-283.

Graves et al., Hybrid computing using a neural network with dynamic external memory. Nature. 2016;538. 21 pages. DOI:10.1038/nature20101.

Lecun et al., Deep learning. Nature. 2015;521:436-444. DOI:10.1038/nature14539.

Misra et al., Artificial neural networks in hardware: A survey of two decades of progress. Neurocomputing. 2010;74:239-255.

Schmidhuber, Deep learning in neural networks: An overview. Neural Networks. 2015;61:85-117.

Shafiee et al., Isaac: A convolutional neural network accelerator with in-situ analog arithmetic in crossbars. ACM/IEEE 43rd Annual International Symposium on Computer Architecture. Oct. 2016. 13 pages.

Shen et al., Deep learning with coherent nanophotonic circuits. Nature Photonics. 2017;11:441-6. DOI: 10.1038/NPHOTON.2017.93.

Shkolnik et al., Robust Quantization: One Model to Rule Them All. 34th Conference on Neural Information Processing Systems. Oct. 22, 2020. 15 pages.

Solli et al., Analog optical computing. Nature Photonics. 2015;9:704-6.

Sun et al., Single-chip microprocessor that communicates directly using light. Nature. 2015;528:534-8. DOI: 10.1038/nature16454.

Tait et al., Broadcast and weight: An integrated network for scalable photonic spike processing. Journal of Lightwave Technology. 2014;32(21):3427-39. DOI: 10.1109/JLT.2014.2345652.

Tait et al., Chapter 8 Photonic Neuromorphic Signal Processing and Computing. Springer, Berlin, Heidelberg. 2014. pp. 183-222.

Tait et al., Neuromorphic photonic networks using silicon photonic weight banks. Science Reports. 2017;7:7430. 10 pages.

Wu et al., Integer Quantization for Deep Learning Inference: Principles and Empirical Evaluation. NVIDIA. Apr. 20, 2020. 20 pages. arXiv:2004.09602v1.

* cited by examiner $$\begin{vmatrix} W_{11} & W_{12} & W_{13} & \cdots & W_{1N} \\ W_{21} & W_{22} & W_{23} & \cdots & W_{2N} \\ W_{31} & W_{32} & W_{33} & \cdots & W_{3N} \\ \vdots & \vdots & \vdots & & \vdots \\ W_{N1} & W_{N2} & W_{N3} & \cdots & W_{NN} \end{vmatrix} \times \begin{vmatrix} x_1 \\ x_2 \\ x_3 \\ \vdots \\ x_N \end{vmatrix} = \begin{vmatrix} y_1 \\ y_2 \\ y_3 \\ \vdots \\ y_N \end{vmatrix}$$

ACCURACY OF LOW-BITWIDTH NEURAL NETWORKS BY REGULARIZING THE HIGHER-ORDER MOMENTS OF WEIGHTS AND HIDDEN STATES

CROSS-REFERENCE TO RELATED APPLICATION

This application claims the benefit under 35 U.S.C. § 119(e) of U.S. Provisional Patent Application Ser. No. 63/150,032, entitled "ACCURACY OF LOW-BITWIDTH NEURAL NETWORKS BY REGULARIZING THE HIGHER-ORDER MOMENTS OF WEIGHTS AND HIDDEN STATES," filed on Feb. 16, 2021, which is hereby incorporated herein by reference in its entirety.

BACKGROUND

Deep learning, machine learning, latent-variable models, neural networks and other matrix-based differentiable programs are used to solve a variety of problems, including natural language processing and object recognition in images. Solving these problems with deep neural networks typically requires long processing times to perform the required computation. The conventional approach to speed up deep learning algorithms has been to develop specialized hardware architectures. This is because conventional computer processors, e.g., central processing units (CPUs), which are composed of circuits including hundreds of millions of transistors to implement logical gates on bits of information represented by electrical signals, are designed for general purpose computing and are therefore not optimized for the particular patterns of data movement and computation required by the algorithms that are used in deep learning and other matrix-based differentiable programs. One conventional example of specialized hardware for use in deep learning are graphics processing units (GPUs) having a highly parallel architecture that makes them more efficient than CPUs for performing image processing and graphical manipulations. After their development for graphics processing, GPUs were found to be more efficient than CPUs for other parallelizable algorithms, such as those used in neural networks and deep learning. This realization, and the increasing popularity of artificial intelligence and deep learning, led to further research into new electronic circuit architectures that could further enhance the speed of these computations.

Deep learning using neural networks conventionally requires two stages: a training stage and an evaluation stage (sometimes referred to as "inference"). Before a deep learning algorithm can be meaningfully executed on a processor, e.g., to classify an image or speech sample, during the evaluation stage, the neural network must first be trained. The training stage can be time consuming and requires intensive computation.

SUMMARY OF THE DISCLOSURE

Some embodiments relate to a method comprising receiving a data set; producing a modified data set by training a neural network using a moment-penalization function and the data set, wherein the moment-penalization function is configured to penalize a moment associated with the neural network, wherein training the neural network comprises: quantizing the data set to obtain a fixed-point data set so that the fixed-point data set represents the data set in a fixed-point representation; and passing the fixed-point data set through an analog accelerator.

Some embodiments relate to a system comprising an analog accelerator; and at least one computer hardware processor to perform: receiving a data set; producing a modified data set by training a neural network using a moment-penalization function and the data set, wherein the moment-penalization function is configured to penalize a moment associated with the data set, wherein training the neural network comprises: quantizing the data set to obtain a fixed-point data set so that the fixed-point data set represents the data set in a fixed-point representation; and passing the fixed-point data set through the analog accelerator.

Some embodiments relate to at least one non-transitory computer-readable storage medium storing processor-executable instructions that, when executed by at least one processor, cause the at least one processor to perform a method comprising: receiving a data set; producing a modified data set by training a neural network using a moment-penalization function and the data set, wherein the moment-penalization function is configured to penalize a moment associated with the data set, wherein training the neural network comprises: quantizing the data set to obtain a fixed-point data set so that the fixed-point data set represents the data set in a fixed-point representation; and passing the fixed-point data set through an analog accelerator.

BRIEF DESCRIPTION OF DRAWINGS

Various aspects and embodiments of the application will be described with reference to the following figures. It should be appreciated that the figures are not necessarily drawn to scale. Items appearing in multiple figures are indicated by the same reference number in the figures in which they appear.

FIG. 1A illustrates a representative matrix-vector multiplication, in accordance with some embodiments.

DETAILED DESCRIPTION

I. Overview

Figure 1B:
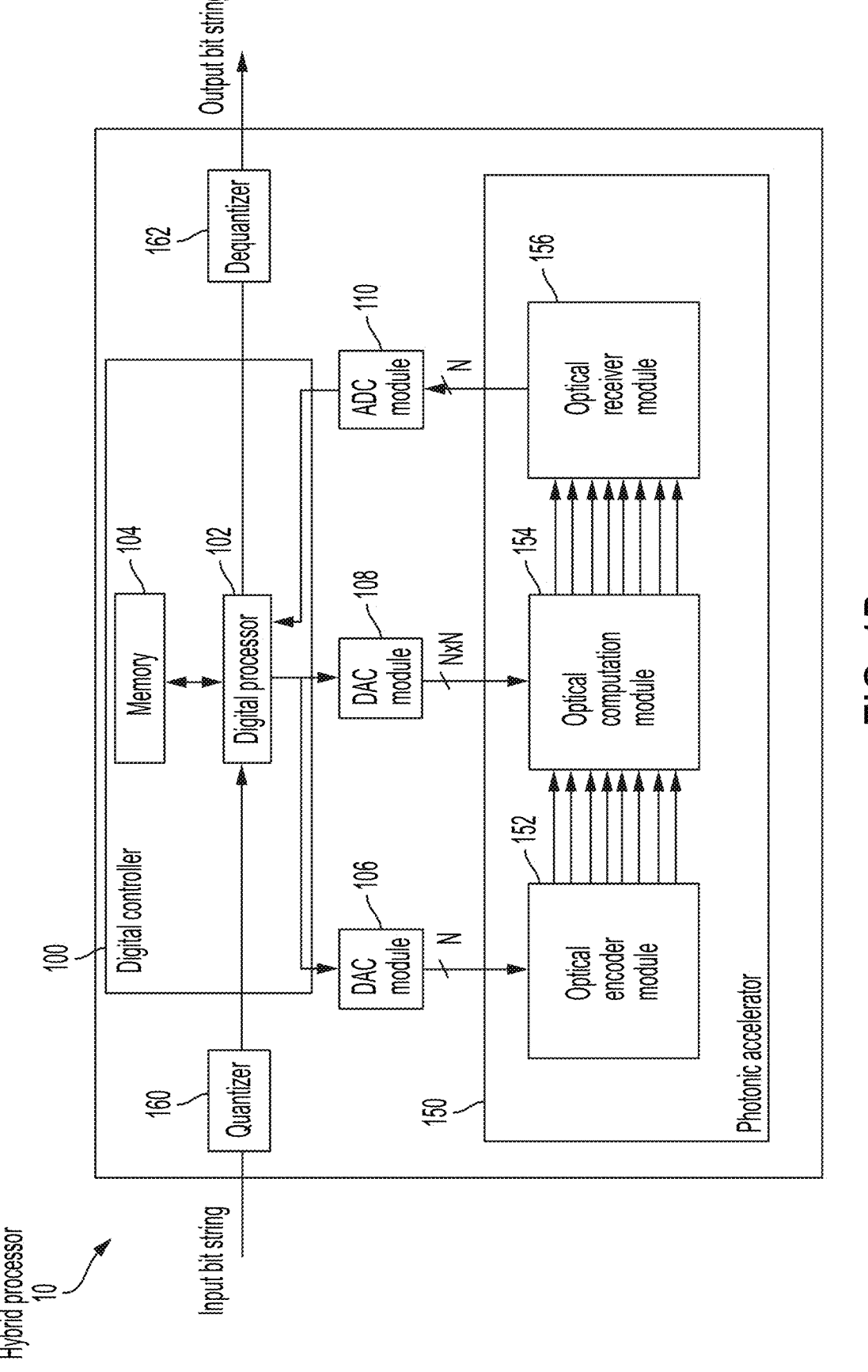
FIG. 1B is a block diagram illustrating a hybrid analog-digital processor configured to perform matrix-vector multiplication, in accordance with some embodiments.

The inventors have recognized and appreciated techniques for training neural networks using low-bitwidth hardware that, compared to previous implementations, reduce the loss of information. The techniques developed by the inventors and described herein are configured to modify the distribution of neural network weights, hidden states and/or other network parameters by penalizing higher-order moments. These techniques reduce the magnitude of outliers while providing greater accuracy in the region of a distribution characterized by fast changing densities. Compared to techniques that involve truncating the tails of a distribution, the techniques described herein provide improved accuracy because information that lies in the tails is moved towards the center of the distribution, as opposed to being discarded.

The inventors have recognized and appreciated that running neural networks on low-bitwidth hardware is desirable for minimizing power consumption in both data center and mobile deployment environments. Low-bitwidth hardware (e.g., b-bit processors with b≤12) allow for computations over data sets of dimensions that, due to power consumption constraints, would be impractical to handle using conventional single-precision floating-point representations or double-precision floating-point representations. Unfortunately, compared to their floating-point counterparts, low-bitwidth accelerators are significantly less accurate.

Typically, the weights of a neural network are trained on floating-point hardware and converted to a fixed-point representation prior to deployment to a low-bitwidth accelerator. The conversion to fixed-point is referred to herein as quantization. A symmetric quantizer Q has 0 as its central code and can be defined as $$Q(x; T, \Delta) = \text{clamp(round}(x/\Delta) \cdot \Delta$$

where x is a floating-point value, T is the threshold value, clamp(•) is a function that clips the value of the argument to be between [−T,T], and $$\Delta = T / (2^{b-1} - 1)$$

is the quantization spacing. In this example, the number of codes is $2^b - 1$, where b represents the number of bits in the fixed-point representation. In some circumstances, one fewer code is used where the quantization aims to represent the numbers 0, −T, and T. T can be chosen for example to be $$T = \max(|X|)$$

for a tensor X, so as to not clip any value within the tensor when quantization is performed.

The inventors have appreciated that quantizing floating-point numbers in this way presents a challenge—information loss can increase significantly where the distribution of floating-point numbers has a long tail (a skew distribution, with a high $3^{rd}$ moment statistic) or two long tails (a leptokurtic distribution, with a high $4^{th}$ moment statistic). The loss of information results from the fact that too many values are mapped to too few codes, particularly in regions of the floating-point distribution where the density is fast changing. The distribution of weights and hidden states in a neural network that exhibits outliers can, as a result, incur significant loss of information.

The techniques developed by the inventors and described herein reduce information loss during forward propagation by modifying an objective function (also referred to as loss function) associated with a neural network to penalize the weights and hidden states that lie in the tails of the respective distributions. Objective functions of the types described herein include functions that define the objective of an optimization. An objective function can produce scalar values formulated from a set of desired responses. Consider for example an objective function for training a neural network $L(y, f(x))$, where y is a target value (e.g., ground truth target value) and $f(x)$ is the tensor output by the network during forward-propagation of the input x.

According to some aspects of the present application, a moment-penalization function is added to an objective function to penalize one or more moments of the distribution of weights and hidden states in a neural network. The moments of a distribution are quantitative measures defining the shape of the distribution. The first moment of a distribution represents the expected value. The second moment of a distribution represents the variance. The third moment of a distribution represents the skewness (the asymmetry of the distribution). The fourth moment of a distribution represents the kurtosis (the tailedness of the distribution). The resulting objective function can be expressed as follows:

$$L(y, f(x)) + \alpha M_k(W) + \beta M_k(H)$$

where the terms $\alpha M_k(W)$ and $\beta M_k(H)$ represent two moment-penalization functions, W represents a set of weights associated with a neural network, H represents a set of hidden states associated with the network, k represents the k-th moment, and α and β represent scaling factors. Thus, $M_k(W)$ is a k-th moment-penalization function for the weights of a neural network and $M_k(H)$ is a k-th moment-penalization function for the hidden states of a neural network. A moment-penalization function where k=3 is referred to as a skewness-penalization function and a moment-penalization function where k=4 is referred to as a kurtosis-penalization function. It should be noted that moments with k>4 may additionally (or alternately) be penalized in some embodiments. The inventors have recognized that training a neural network using such a modified objective function augments the accuracy and robustness of the neural network notwithstanding the use of low-bitwidth accelerators.

II. Examples of Analog Accelerators

Aspects of the present application relate to neural networks configured to run on analog accelerators. Accelerators are microprocessors that are capable of accelerating certain types of workloads. Typically, workloads that can be accelerated are offloaded to high-performance accelerators, which are much more efficient at performing workloads such as artificial intelligence, machine vision, and deep learning. Accelerators are specific purpose processors and are often programmed to work in conjunction with general purpose processors to perform a task. Analog accelerators are accelerators that perform computations in the analog domain. As such, analog accelerators typically involve digital-to-analog conversion and analog-to-digital conversion, which allow an analog accelerator to communicate with digital hardware.

Photonic accelerators are a particular class of analog accelerators in which computations are performed in the optical domain (using light). The inventors have recognized and appreciated that using optical signals (instead of, or in combination with, electrical signals) overcomes some of the problems with electronic computing. Optical signals travel at the speed of light. Thus, the latency of optical signals is far less of a limitation than electrical propagation delay. Additionally, virtually no power is dissipated by increasing the distance traveled by the light signals, opening up new topologies and processor layouts that would not be feasible using electrical signals. Thus, photonic processors offer far better speed and efficiency performance than conventional electronic processors.

Some embodiments relate to photonic processors designed to run machine learning algorithms or other types of data-intensive computations. Certain machine learning algorithms (e.g., support vector machines, artificial neural networks and probabilistic graphical model learning) rely heavily on linear transformations on multi-dimensional arrays/tensors. The simplest linear transformation is a matrix-vector multiplication, which using conventional algorithms has a complexity on the order of $O(N^2)$, where N is the dimensionality of a square matrix being multiplied by a vector of the same dimension. General matrix-matrix (GEMM) operations are ubiquitous in software algorithms, including those for graphics processing, artificial intelligence, neural networks and deep learning.

FIG. 1A is a representation of a matrix-vector multiplication, in accordance with some embodiments. Matrix-vector multiplication is an example of GEMM. Matrix W is referred to herein as "weight matrix," "input matrix" or simply "matrix," and the individual elements of matrix W are referred to herein as "weights," "matrix values" or "matrix parameters." Vector X is referred to herein as "input vector," and the individual elements of vector X are referred to as "input values," or simply "inputs." Vector Y is referred to herein as "output vector," and the individual elements of vector Y are referred to as "output values," or simply "outputs." In this example, W is an N×N matrix, though embodiments of the present application are not limited to square matrices or to any specific dimension. In the context of artificial neural networks, matrix W can be a weight matrix, or a block of submatrix of the weight tensor, or an activation (batched) matrix, or a block of submatrix of the (batched) activation tensor, among several possible examples. Similarly, the input vector X can be a vector of the weight tensor or a vector of the activation tensor, for example.

The matrix-vector multiplication of FIG. 1A can be decomposed in terms of scalar multiplications and scalar additions. For example, an output value $y_i$ (where i=1, 2 . . . N) can be computed as a linear combination of the input values $x_1, x_2 \ldots x_N$. Obtaining $y_i$ involves performing scalar multiplications (e.g., $W_{i1}$ times $x_1$, and $W_{i2}$ times $x_2$) and scalar additions (e.g., $W_{i1}x_1$ plus $W_{i2}x_2$). In some embodiments, scalar multiplications, scalar additions, or both, may be performed in the optical domain, as discussed in detail further below.

FIG. 1B illustrates a hybrid analog-digital processor 10 implemented using photonic circuits, in accordance with some embodiments. Hybrid processor 10 may be configured to perform matrix-vector multiplications (of the types illustrated in FIG. 1A, for example). Hybrid processor 10 includes a digital controller 100 and a photonic accelerator 150. Digital controller 100 operates in the digital domain and photonic accelerator 150 operates in the analog photonic domain. A quantizer 160 converts floating-point input bit strings to fixed-point representations. In some embodiments, quantizer 160 may be characterized by a function Q of the types described above. In some embodiments, the quantizer may produce low-bitwidth fixed-point values, which reduces power consumption relative to higher bitwidths. For example, the number of bits b in the fixed-point representation may be less than or equal to 8, 10 or 12. A dequantizer 162 converts fixed-point output bit strings back to the floating-point representation.

Digital controller 100 includes a digital processor 102 and a memory 104. Photonic accelerator 150 includes an optical encoder module 152, an optical computation module 154 and an optical receiver module 156. Digital-to-analog (DAC) modules 106 and 108 convert fixed-point digital data to analog signals. Analog-to-digital (ADC) module 110 converts analog signals to fixed-point digital values. Thus, the DAC/ADC modules provide an interface between the digital domain and the analog domain. In this example, DAC module 106 produces N analog signals (one for each entry of an input vector), DAC module 108 produces N×N analog signals (one for each entry of a matrix), and ADC module 110 receives N analog signals (one for each entry of an output vector). Although matrix W is square in this example, it may be rectangular in some embodiments, such that the size of the output vector differs from the size of the input vector.

Hybrid processor 10 receives, as an input from an external processor (e.g., a CPU), an input vector represented by a group of input bit strings and produces an output vector represented by a group of output bit strings. For example, if the input vector is an N-dimensional vector, the input vector may be represented by N separate bit strings, each bit string representing a respective component of the vector. The input bit string may be received as an electrical signal from the external processor and the output bit string may be transmitted as an electrical signal to the external processor. In some embodiments, digital processor 102 does not necessarily output an output bit string after every process iteration. Instead, the digital processor 102 may use one or more output bit strings to determine a new input bit stream to feed through the components of the hybrid processor 10. In some embodiments, the output bit string itself may be used as the input bit string for a subsequent iteration of the process implemented by the hybrid processor 10. In other embodiments, multiple output bit streams are combined in various ways to determine a subsequent input bit string. For example, one or more output bit strings may be summed together as part of the determination of the subsequent input bit string.

DAC module 106 is configured to convert fixed-point data into analog signals. The optical encoder module 152 is configured to convert the analog signals into optically encoded information to be processed by the optical computation module 154. The information may be encoded in the amplitude, phase and/or frequency of an optical pulse. Accordingly, optical encoder module 152 may include optical amplitude modulators, optical phase modulators and/or optical frequency modulators. In some embodiments, the optical signal represents the value and sign of the associated bit string as an amplitude and a phase of an optical pulse. In some embodiments, the phase may be limited to a binary choice of either a zero phase shift or a $\pi$ phase shift, representing a positive and negative value, respectively. Embodiments are not limited to real input vector values. Complex vector components may be represented by, for example, using more than two phase values when encoding the optical signal.

The optical encoder module 152 outputs N separate optical pulses that are transmitted to the optical computation module 154. Each output of the optical encoder module 152 is coupled one-to-one to an input of the optical computation module 154. In some embodiments, the optical encoder module 152 may be disposed on the same substrate as the optical computation module 154 (e.g., the optical encoder module 152 and the optical computation module 154 are on the same chip). In such embodiments, the optical signals may be transmitted from the optical encoder module 152 to the optical computation module 154 in waveguides, such as silicon photonic waveguides. In other embodiments, the optical encoder module 152 may be disposed on a separate substrate from the optical computation module 154. In such embodiments, the optical signals may be transmitted from the optical encoder module 152 to optical computation module 154 with optical fibers.

The optical computation module 154 performs the multiplication of an input vector X by a matrix W. In some embodiments, optical computation module 154 includes multiple optical multipliers each configured to perform a scalar multiplication between an entry of the input vector and an entry of matrix W in the optical domain. Optionally, optical computation module 154 may further include optical adders for adding the results of the scalar multiplications to one another in the optical domain. Alternatively, the additions may be performed electrically. For example, optical receiver module 156 may produce a voltage resulting from the integration (over time) of a photocurrent received from a photodetector.

The optical computation module 154 outputs N separate optical pulses that are transmitted to the optical receiver module 156. Each output of the optical computation module 154 is coupled one-to-one to an input of the optical receiver module 156. In some embodiments, the optical computation module 154 may be disposed on the same substrate as the optical receiver module 156 (e.g., the optical computation module 154 and the optical receiver module 156 are on the same chip). In such embodiments, the optical signals may be transmitted from the optical computation module 154 to the optical receiver module 156 in silicon photonic waveguides. In other embodiments, the optical computation module 154 may be disposed on a separate substrate from the optical receiver module 156. In such embodiments, the optical signals may be transmitted from the photonic processor 103 to the optical receiver module 156 using optical fibers.

The optical receiver module 156 receives the N optical pulses from the optical computation module 154. Each of the optical pulses is then converted to an electrical analog signal. In some embodiments, the intensity and phase of each of the optical pulses is detected by optical detectors within the optical receiver module. The electrical signals representing those measured values are then converted into the fixed-point digital domain using ADC module 110, and provided back to the digital processor 102.

The digital processor 102 controls the optical encoder module 152, the optical computation module 154 and the optical receiver module 156. The memory 104 may be used to store input and output bit strings and measurement results from the optical receiver module 156. The memory 104 also stores executable instructions that, when executed by the digital processor 102, control the optical encoder module 152, optical computation module 154 and optical receiver module 156. The memory 104 may also include executable instructions that cause the digital processor 102 to determine a new input vector to send to the optical encoder based on a collection of one or more output vectors determined by the measurement performed by the optical receiver module 156. In this way, the digital processor 102 can control an iterative process by which an input vector is multiplied by multiple matrices by adjusting the settings of the optical computation module 154 and feeding detection information from the optical receiver module 156 back to the optical encoder module 152. Thus, the output vector transmitted by the hybrid processor 10 to the external processor may be the result of multiple matrix-matrix multiplications, not simply a single matrix-matrix multiplication.

Figure 2:
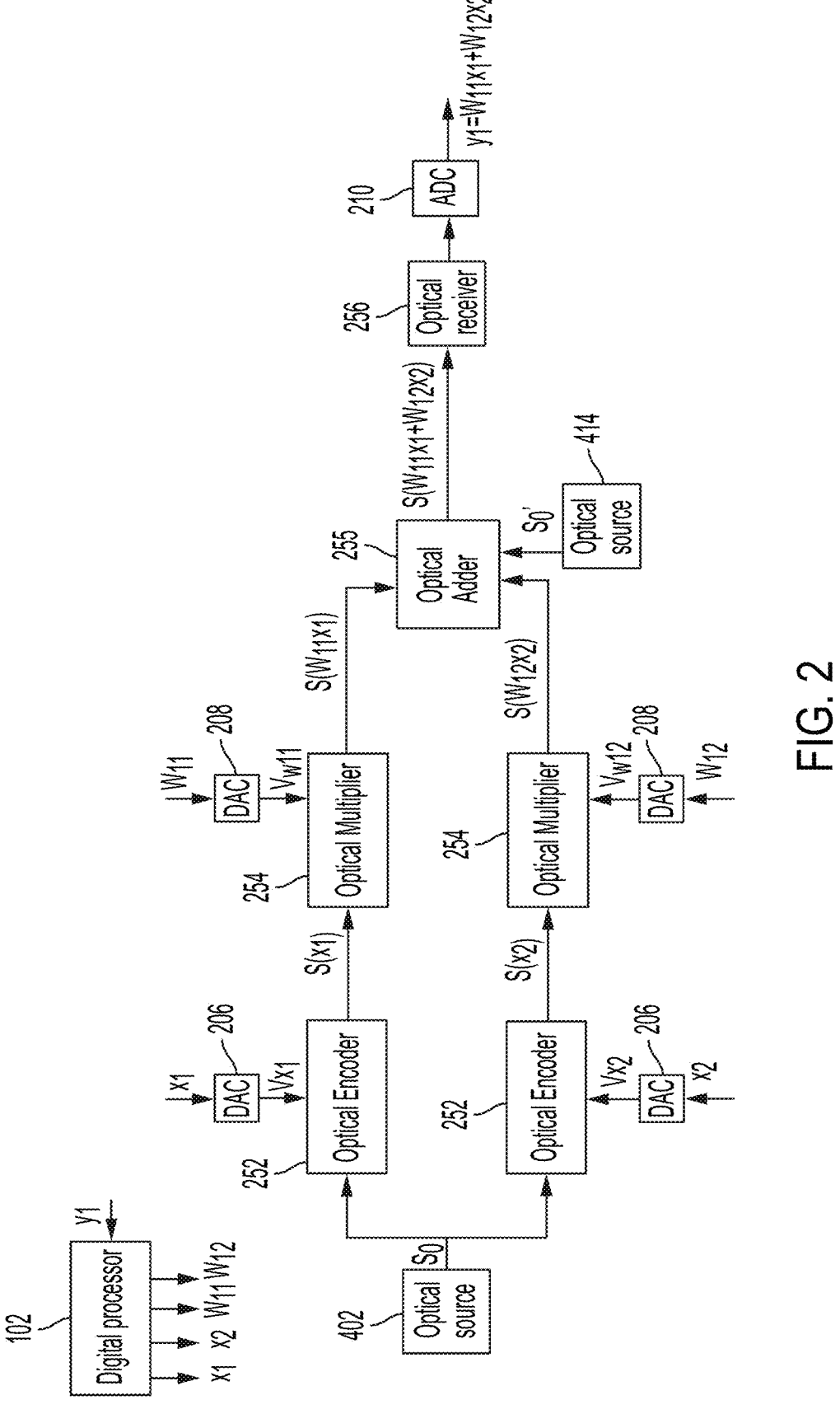
FIG. 2 is a block diagram illustrating a portion of the photonic accelerator of FIG. 1B, in accordance with some embodiments.

FIG. 2 illustrates a portion of photonic accelerator 150 in additional detail, in accordance with some embodiments. More specifically, FIG. 2 illustrates the circuitry for computing $y_1$, the first entry of output vector Y. For simplicity, in this example, the input vector has only two entries, $x_1$ and $x_2$. However, the input vector may have any suitable size.

DAC module 106 includes DACs 206, DAC module 108 includes DACs 208, and ADC module 110 includes ADC 210. DACs 206 produce electrical analog signals (e.g., voltages or currents) based on the value that they receive. For example, voltage $V_{x1}$ represents value $x_1$, voltage $V_{x2}$ represents value $x_2$, voltage $V_{W11}$ represents value $W_{11}$, and voltage $V_{W12}$ represents value $W_{12}$. Optical encoder module 152 includes optical encoders 252, optical computation module 154 includes optical multipliers 154 and optical adder 255, and optical receiver module 156 includes optical receiver 256.

Optical source 402 produces light $S_0$. Optical source 402 may be implemented in any suitable way. For example, optical source 402 may include a laser, such as an edge-emitting laser of a vertical cavity surface emitting laser (VCSEL), examples of which are described in detail further below. In some embodiments, optical source 402 may be configured to produce multiple wavelengths of light, which enables optical processing leveraging wavelength division multiplexing (WDM), as described in detail further below. For example, optical source 402 may include multiple laser cavities, where each cavity is specifically sized to produce a different wavelength.

The optical encoders 252 encode the input vector into a plurality of optical signals. For example, one optical encoder 252 encodes input value $x_1$ into optical signal $S(x_1)$ and another optical encoder 252 encodes input value $x_2$ into optical signal $S(x_2)$. Input values $x_1$ and $x_2$, which are provided by digital processor 102, are digital signed real numbers (e.g., with a floating point or fixed point digital representation). The optical encoders modulate light $S_0$ based on the respective input voltage. For example, optical encoder 404 modulates amplitude, phase and/or frequency of the light to produce optical signal $S(x_1)$ and optical encoder 406 modulates the amplitude, phase and/or frequency of the light to produce optical signal $S(x_2)$. The optical encoders may be implemented using any suitable optical modulator, including for example optical intensity modulators. Examples of such modulators include Mach-Zehnder modulators (MZM), Franz-Keldysh modulators (FKM), resonant modulators (e.g., ring-based or disc-based), nano-electro-electro-mechanical-system (NOEMS) modulators, etc.

The optical multipliers are designed to produce signals indicative of a product between an input value and a matrix value. For example, one optical multiplier 254 produces a signal $S(W_{11}x_1)$ that is indicative of the product between input value $x_1$ and matrix value $A_{11}$ and another optical multiplier 254 produces a signal $S(W_{12}x_2)$ that is indicative of the product between input value $x_2$ and matrix value $W_{12}$. Examples of optical multipliers include Mach-Zehnder modulators (MZM), Franz-Keldysh modulators (FKM), resonant modulators (e.g., ring-based or disc-based), nano-electro-electro-mechanical-system (NOEMS) modulators, etc. In one example, an optical multiplier may be implemented using a modulatable detector. Modulatable detectors are photodetectors having a characteristic that can be modulated using an input voltage. For example, a modulatable detector may be a photodetector with a responsivity that can be modulated using an input voltage. In this example, the input voltage (e.g., $V_{W11}$) sets the responsivity of the photodetector. The result is that the output of a modulatable detector depends not only on the amplitude of the input optical signal but also on the input voltage. If the modulatable detector is operated in its linear region, the output of a modulatable detector depends on the product of the amplitude of the input optical signal and the input voltage (thereby achieving the desired multiplication function).

Optical adder 412 receives electronic analog signals $S(W_{11}x_1)$ and $S(W_{12}x_2)$ and light $S_0'$ (generated by optical source 414), and produces an optical signal $S(W_{11}x_1 + W_{12}x_2)$ that is indicative of the sum of $W_{11}x_1$ with $W_{12}x_2$.

Optical receiver 256 generates an electronic digital signal indicative of the sum $W_{11}x_1 + W_{12}x_2$ based on the optical signal $S(W_{11}x_1 + W_{12}x_2)$. In some embodiments, optical receiver 256 includes a coherent detector and a trans-impedance amplifier. The coherent detector produces an output that is indicative of the phase difference between the waveguides of an interferometer. Because the phase difference is a function of the sum $W_{11}x_1 + W_{12}x_2$, the output of the coherent detector is also indicative of that sum. The ADC converts the output of the coherent receiver to output value $y_1 W_{11}x_1 + W_{12}x_2$. Output value $y_1$ may be provided as input back to digital processor 102, which may use the output value for further processing.

III. Moment-Penalization Functions

Figure 3:
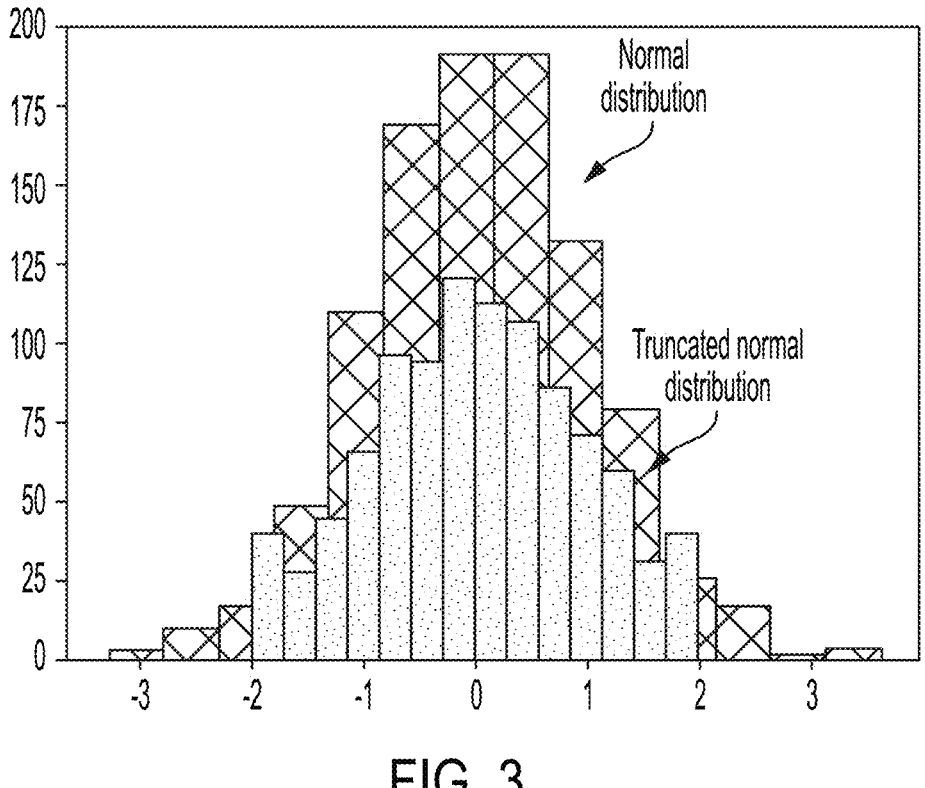
FIG. 3 is a plot illustrating a representative normal distribution and a truncated normal distribution, in accordance with some embodiments.

Conventional techniques for training neural networks using low-bitwidth accelerators involve truncating the tails of the distribution. One such example is illustrated in FIG. 3. Here, a data set is modified so that the tail of the distribution is truncated. As a result, a truncated distribution is obtained starting from a normal distribution. The inventors have appreciated that truncating the tails of a distribution in this manner leads to significant loss of information—all information that lies in the tails is effectively lost. The inventors have recognized and appreciated that, if instead of discarding the information that lies in the tails of a distribution as shown in FIG. 3, such information is moved closer to the center of the distribution, the overall loss of information is substantially reduced. The techniques developed by the inventors rely on moment-penalization functions. Moment-penalization functions are functions that, when added to an objective function, penalize one or more moments associated with a data set. The data set may be the input to the neural network, the weights of the neural network, the biases of the neural network or the intermediate activations of the neural network.

Figure 4A:
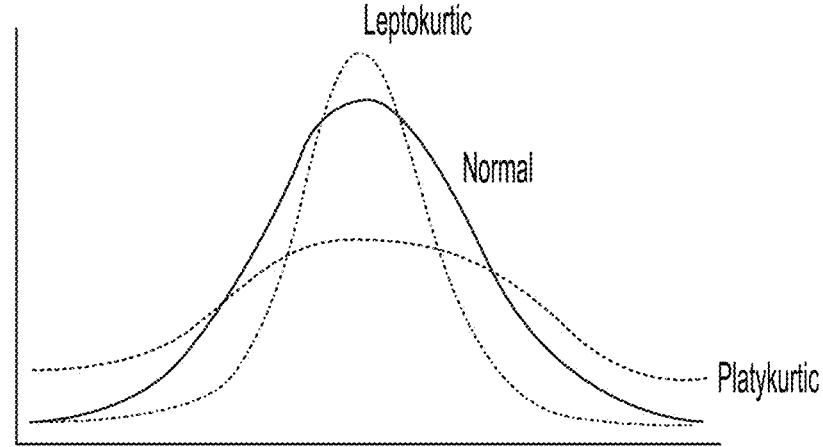
FIG. 4A is a plot illustrating a representative normal distribution, a leptokurtic distribution and a platykurtic distribution, in accordance with some embodiments.

FIG. 4A is a plot illustrating three representative distributions: a normal distribution, a leptokurtic distribution and a platykurtic distribution. The normal distribution is characterized by a kurtosis equal to 3. The leptokurtic distribution is characterized by a positive excess kurtosis (the kurtosis is greater than 3). The platykurtic distribution is characterized by a negative excess kurtosis (the kurtosis is less than 3). Leptokurtic distributions tend to have fast-changing densities in the region close to the center of the distribution whereas platykurtic distribution tend to be flatter. For this reason, more information loss results in the case where a leptokurtic distribution is quantized than in the case where a platykurtic distribution is quantized.

Figure 4B:
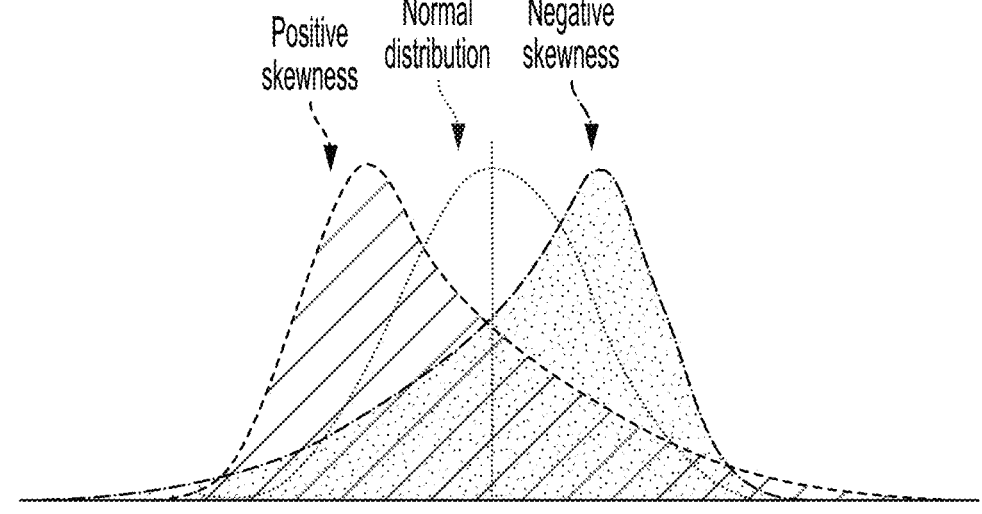
FIG. 4B is a plot illustrating a representative normal distribution, a distribution with a positive skewness and a distribution with a negative skewness, in accordance with some embodiments.

FIG. 4B is a plot illustrating a representative normal distribution, a distribution with a positive skewness and a distribution with a negative skewness. The densities of the skew distributions tend to vary faster than in the normal distribution. For this reason, more information loss results in the case where a skew distribution is quantized than in the case where a normal distribution is quantized.

Figure 5:
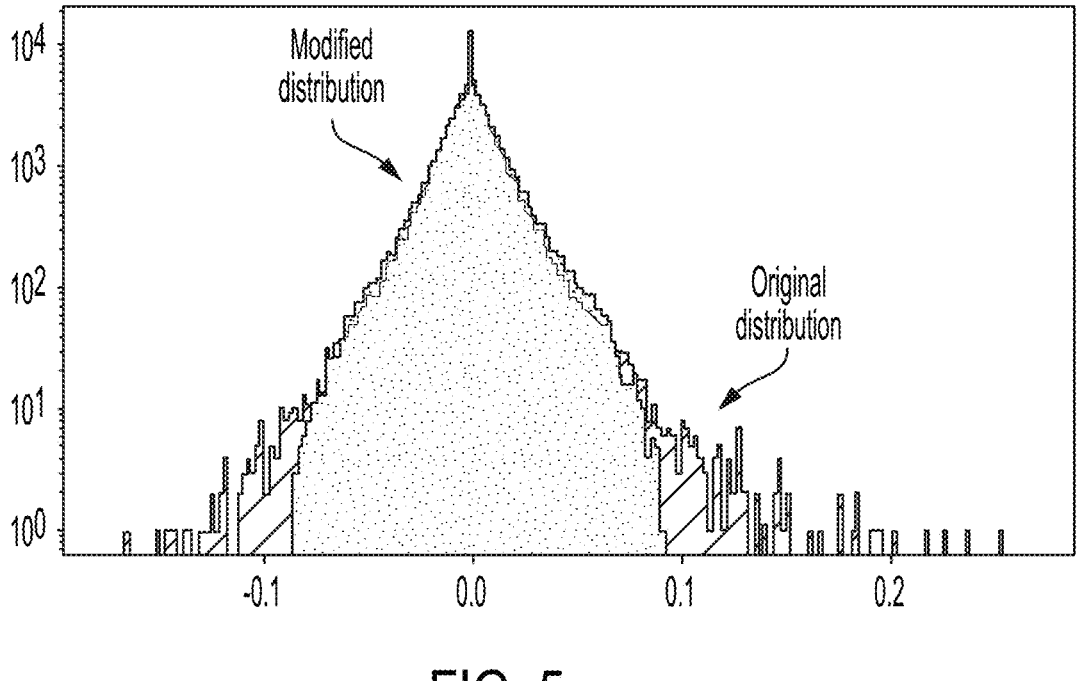
FIG. 5 is a plot illustrating the distribution of an data set and a data set modified in accordance with a moment-penalization function, in accordance with some embodiments.

In accordance with one aspect of the present application, moment-penalization functions are used to compensate for the loss of information resulting from quantizing a distribution having a relatively large skew (in absolute value) and/or a positive excess kurtosis. An example of a modified objective function is the following:

$$L_{modified}(y, f(x)) = L(y, f(x)) + 0.001 \sum_l E\left[\frac{(W_l - \mu)^4}{\sigma}\right]$$

where $\alpha = 0.001$, l is an index representing the $l^{th}$ layer, $\mu$ represents the expected value of the distribution, $\sigma$ represents the standard deviation of the distribution and $W_l$ represents the weight matrix of layer l. As an example, the effect of modifying an objective function $L(y, f(x))$ with a ResNet-50 can be seen in the example of FIG. 5. Here, a ResNet-50 is trained with cross entropy loss and the kurtosis is penalized in accordance with the modified objective function $L_{modified}(y, f(x))$. Further, in this example, training is performed with 5 epochs from a pre-trained FP32 network, with standard stochastic gradient descent of learning rate 0.001 and no weight decay. The learning rate is multiplied by 0.3 at the end of the first and third epochs. The modified objective function reduces the magnitude of outliers while at the same time achieving greater accuracy.

More generally, an objective function can be modified using moment-penalization functions of any order. For example, a modified objective function can be expressed as follows:

$$L_{modified}(y, f(x)) = L(y, f(x)) + \sum_{k=1}^{N} \alpha_k M_k(W) + \sum_{k=1}^{N} \beta_k M_k(H)$$

where $\alpha_k M_k(W)$ is a $k^{th}$ moment-penalization function for a weight distribution (W) and $\beta_k M_k(H)$ is a $k^{th}$ moment-penalization function for a hidden state distribution (H). In principle, all higher order moments can be penalized when training a neural network. However, in practice, limiting the number of moments to be penalized reduces the amount of computation needed to train the particular network.

Figure 6A:
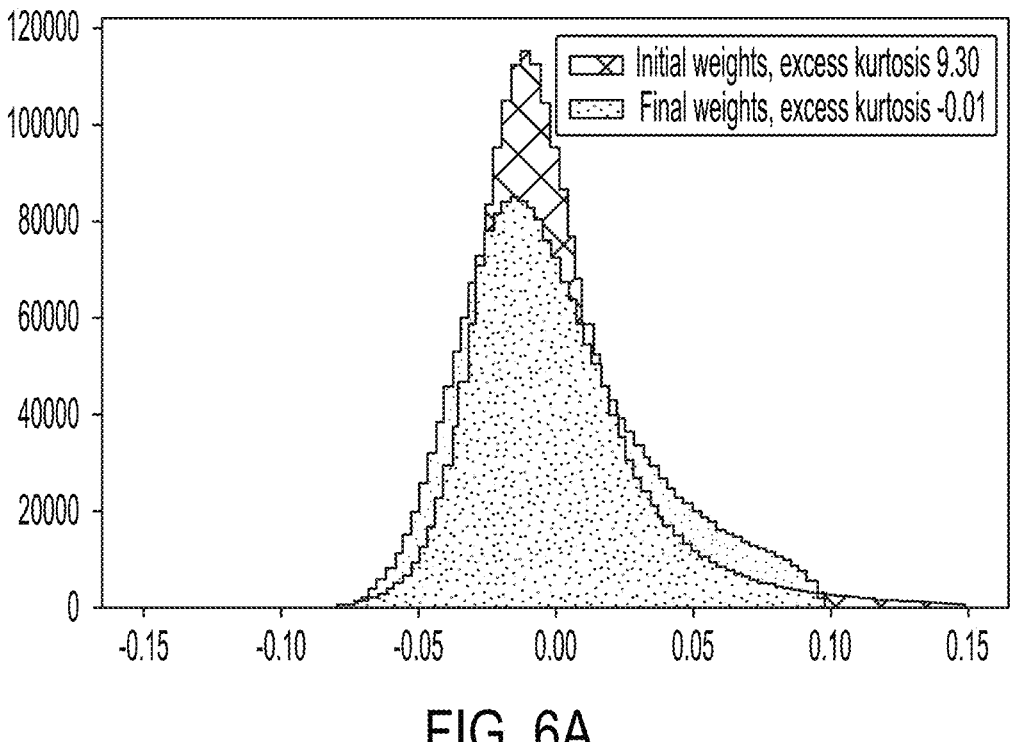
FIG. 6A-6C are plots illustrating a normal distribution, a uniform distribution, and a bimodal distribution, respectively, in accordance with some embodiments.
Figure 6B:
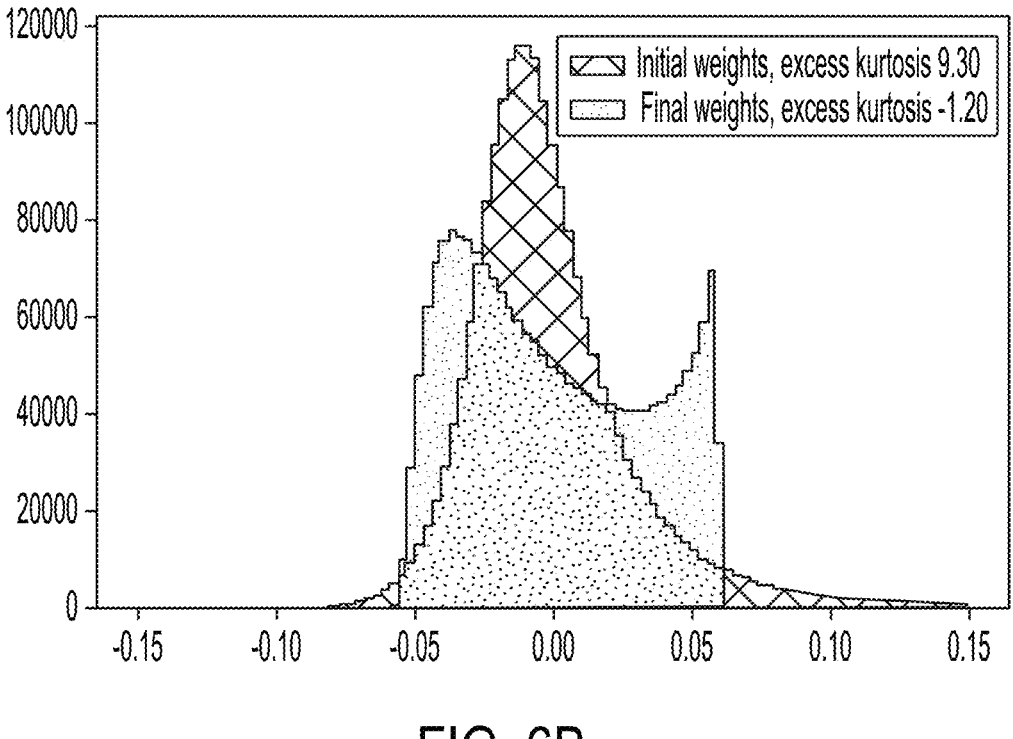
Figure 6C:
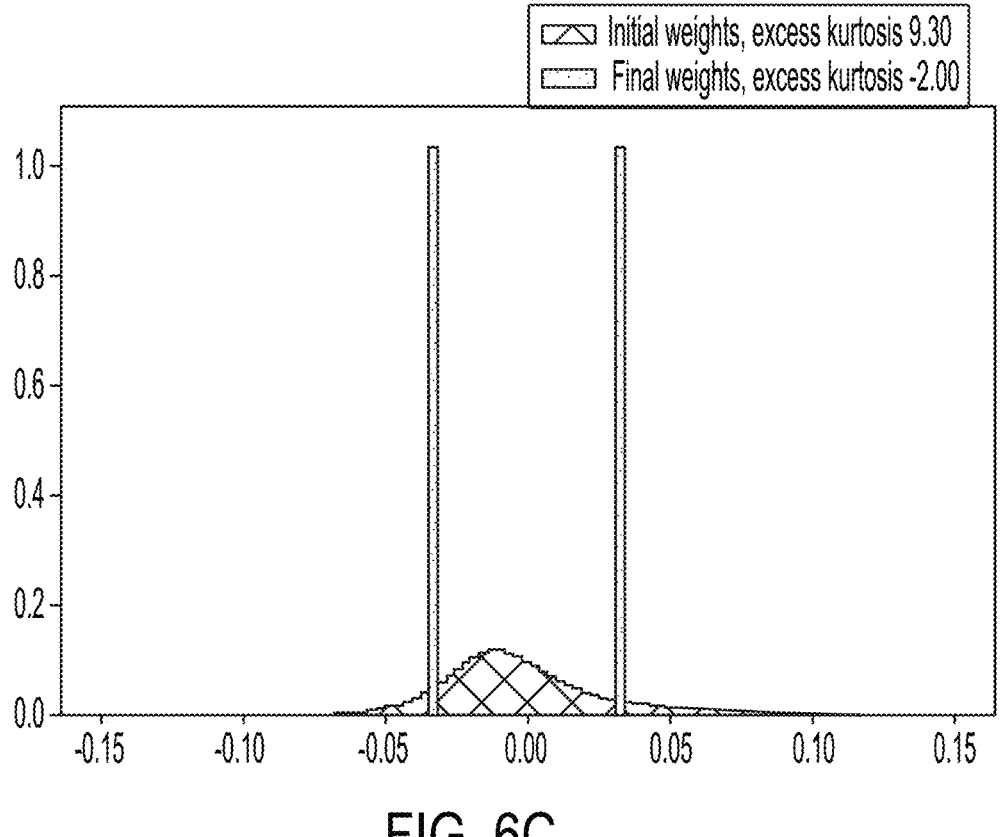

In some embodiments, an input distribution may be modified to target a desired excess kurtosis, and a result, to target a desired distribution shape. For example, an input distribution may be modified to target an excess kurtosis equal to zero (which is equivalent to targeting a normal distribution). FIG. 6A-6C are plots illustrating modified distributions that closely resemble a normal distribution, a uniform distribution, and a bimodal distribution, respectively, in accordance with some embodiments. In the plot of FIG. 6A, the input weight distribution exhibits an excess kurtosis equal to 9.30. After the modification, the distribution exhibits an excess kurtosis substantially closer to 0.

Thus, the modified weight is close to a normal distribution. In the plot of FIG. 6B, the modified weight exhibits an excess kurtosis substantially equal to −1.20. Thus, the modified weight is close to a uniform distribution. In the plot of FIG. 6C, the modified data set exhibits an excess kurtosis equal to −2. Thus, the modified weight has a bimodal distribution.

Accordingly, some embodiments relate to methods for training neural networks. One such method may involve receiving a data set (e.g., input data set x). The method may further involve producing a modified data set (e.g., a modified version of input data set x, a modified set of weights, a modified set of biases or a modified set of intermediate activations) by training a neural network using a moment-penalization function (e.g., $\alpha_k M_k(W)$ and/or $\beta_k M_k(H)$) and the data set. The moment-penalization function is configured to penalize the $k^{th}$ moment associated with the neural network (e.g., the $k^{th}$ moment associated with input data set x, the weights, the biases and/or the intermediate activations). Training the neural network in turn involves quantizing (e.g., using quantizer 160) the data (the input data set x, the weights/biases, or the intermediate activations) to obtain a fixed-point data so that the fixed-point data represents the input data in a fixed-point representation, and passing the fixed-point data through an analog accelerator (e.g., photonic accelerator 150). Including the moment penalization functions when training a neural network allows one to obtain a neural network of good quality (e.g., with good accuracy or good F1-score when performing a task) while controlling the distribution of the input tensors, the weight/ bias tensors, or the hidden activation tensors. The distribution of these tensors can be molded to fit the numerical limitations of using an analog accelerators. For example, some analog accelerators may only accept positive tensors, or some analog accelerators may only accept symmetrically quantized tensors. In other cases, the analog accelerators may perform better with asymmetrically quantized tensors.

IV. Additional Comments

Having thus described several aspects and embodiments of the technology of this application, it is to be appreciated that various alterations, modifications, and improvements will readily occur to those of ordinary skill in the art. Such alterations, modifications, and improvements are intended to be within the spirit and scope of the technology described in the application. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, and/or methods described herein, if such features, systems, articles, materials, and/or methods are not mutually inconsistent, is included within the scope of the present disclosure.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

The definitions, as defined and used herein, should be understood to control over dictionary definitions, definitions in documents incorporated by reference and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some case and disjunctively present in other cases.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

The terms "approximately," "substantially," and "about" may be used to mean within ±20% of a target value in some embodiments. The terms "approximately," "substantially," and "about" may include the target value.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another claim element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

What is claimed is:

1. A method comprising:
receiving a data set;
producing a modified data set by training a neural network using a modified objective function and the data set, wherein training the neural network comprises:
modifying an objective function associated with the neural network by adding a moment-penalization function to an objective function to produce the modified objective function, wherein the moment-penalization function is configured to penalize a moment associated with the neural network;
quantizing the data set to obtain a fixed-point data set so that the fixed-point data set represents the data set in a fixed-point representation; and
passing the fixed-point data set through an analog accelerator to produce the modified data set.

2. The method of claim 1, wherein the modified data set exhibits a distribution selected from the group consisting of:
a normal distribution,
a uniform distribution, and
a bimodal distribution.

3. The method of claim 1, wherein the data set exhibits a leptokurtic distribution.

4. The method of claim 1, wherein the moment-penalization function is configured to penalize a kurtosis associated with the data set.

5. The method of claim 4, wherein adding the moment-penalization function to the objective function comprises adding a a kurtosis-penalization function to the objective function.

6. The method of claim 5, wherein the kurtosis-penalization function is configured to penalize the kurtosis associated with a set of weights of the neural network and/or a set of hidden layers of the neural network.

7. The method of claim 1, wherein the moment-penalization function is configured to penalize a skewness associated with the data set.

8. The method of claim 7, wherein adding the moment-penalization function to the objective function comprises adding a skewness-penalization function to the objective function.

9. The method of claim 8, wherein the skewness-penalization function is configured to penalize the skewness associated with a set of weights of the neural network and/or a set of hidden layers of the neural network.

10. The method of claim 1, wherein quantizing the data set to obtain the fixed-point data set comprises quantizing the data set using an b-bit quantizer with $b \leq 12$.

11. The method of claim 1, wherein the analog accelerator comprises a photonic accelerator, and wherein passing the fixed-point data set through the analog accelerator comprises performing matrix-matrix multiplication in an optical domain.

12. The method of claim 11, wherein performing matrix-matrix multiplication in the optical domain comprises encoding light with a plurality of weights representing the neural network.

13. A system comprising:

an analog accelerator; and at least one computer hardware processor to perform:

receiving a data set;

producing a modified data set by training a neural network using a modified objective function and the data set, wherein training the neural network comprises:

modifying an objective function associated with the neural network by adding a moment-penalization function to the objective function to produce the modified objective function, wherein the moment-penalization function is configured to penalize a moment associated with the neural network;

quantizing the data set to obtain a fixed-point data set so that the fixed-point data set represents the data set in a fixed-point representation; and passing the fixed-point data set through the analog accelerator to produce the modified data set.

14. The system of claim 13, wherein the modified data set exhibits a distribution selected from the group consisting of:

a normal distribution, a uniform distribution, and a bimodal distribution.

15. The system of claim 13, wherein the data set exhibits a leptokurtic distribution.

16. The system of claim 13, wherein the moment-penalization function is configured to penalize a kurtosis associated with the data set.

17. The system of claim 16, wherein adding the moment-penalization function to the objective function comprises adding a kurtosis-penalization function to the objective function.

18. The system of claim 13, wherein the moment-penalization function is configured to penalize a skewness associated with the data set.

19. The system of claim 18, wherein adding the moment-penalization function to the objective function comprises adding a skewness-penalization function to the objective function.

20. The system of claim 13, wherein quantizing the data set to obtain the fixed-point data set comprises quantizing the data set using an b-bit quantizer with $b \leq 12$.

21. The system of claim 13, wherein the analog accelerator comprises a photonic accelerator, and wherein passing the fixed-point data set through the analog accelerator comprises performing matrix-matrix multiplication in an optical domain.

22. At least one non-transitory computer-readable storage medium storing processor-executable instructions that, when executed by at least one processor, cause the at least one processor to perform a method comprising:

receiving a data set;

producing a modified data set by training a neural network using a modified objective function and the data set, wherein training the neural network comprises:

modifying an objective function associated with the neural network by adding a moment-penalization function to the objective function to produce the modified objective function, wherein the moment-penalization function is configured to penalize a moment associated with the neural network;

quantizing the data set to obtain a fixed-point data set so that the fixed-point data set represents the data set in a fixed-point representation; and passing the fixed-point data set through an analog accelerator to produce the modified data set.

23. The at least one non-transitory computer-readable storage medium of claim 22, wherein the modified data set exhibits a distribution selected from the group consisting of:

a normal distribution, a uniform distribution, and a bimodal distribution.

24. The at least one non-transitory computer-readable storage medium of claim 22, wherein the data set exhibits a leptokurtic distribution.

\* \* \* \* \*